(12) United States Patent
Cleveland et al.

(10) Patent No.: US 8,151,051 B2
(45) Date of Patent: Apr. 3, 2012

(54) REDUNDANT SOLID STATE DISK SYSTEM VIA INTERCONNECT CARDS

(75) Inventors: Lee Dale Cleveland, Rochester, MN (US); Seth David Lewis, Rochester, MN (US); Christopher William Mann, Rochester, MN (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/429,105

(22) Filed: Apr. 23, 2009

(65) Prior Publication Data

US 2010/0274965 A1    Oct. 28, 2010

(51) Int. Cl.
*G06F 12/08* (2006.01)
*G06F 13/00* (2006.01)

(52) U.S. Cl. .............. 711/114; 711/E12.019; 710/301

(58) Field of Classification Search .............. 711/114, 711/E12.019; 710/301
See application file for complete search history.

(56) References Cited

U.S. PATENT DOCUMENTS

| | | | |
|---|---|---|---|
| 6,567,889 B1 | 5/2003 | DeKoning et al. | |
| 7,149,846 B2 | 12/2006 | Hetrick | |
| 7,353,306 B2 * | 4/2008 | Thorpe et al. | 710/74 |
| 2006/0004957 A1 | 1/2006 | Hand, III et al. | |
| 2008/0010530 A1 | 1/2008 | Davies et al. | |
| 2008/0126849 A1 | 5/2008 | Kotzur et al. | |
| 2008/0147844 A1 | 6/2008 | Islam et al. | |
| 2008/0155156 A1 | 6/2008 | Mussatt et al. | |
| 2008/0162987 A1 | 7/2008 | El-Batal | |
| 2008/0172571 A1 | 7/2008 | Andrews et al. | |
| 2009/0327588 A1 * | 12/2009 | Sutardja et al. | 711/103 |

OTHER PUBLICATIONS

Intel, "Benefits of Intel Matrix Storage Technology" White Paper, Dec. 2005.*
Neer et al., "Serial Attached SCSI Cable and Connectors", SCSI Trade Association White Paper.*
Agrawal et al., "Design Tradeoffs for SSD Performance", USENIX 2008 Annual Technical Conference, USENIX Association, Berkley, California, published 2008, 14 pgs.
Chang, "Hybrid Solid-State Disks: Combining Heterogeneous NAND Flash in Large SSDs", IEEE Computer Society Press, Los Alamitos, California, published 2008, 6 pgs.

* cited by examiner

*Primary Examiner* — Alexander Sofocleous
*Assistant Examiner* — Hai Pham
(74) *Attorney, Agent, or Firm* — Rabindranath Dutta; Konrad Raynes and Victor LLP

(57) ABSTRACT

A first interconnect card is configured, wherein a first controller is included in the first interconnect card. A second interconnect card coupled to the first interconnect card is configured, wherein a second controller is included in the second interconnect card. In response to a failure of the first controller included in the first interconnect card, the first interconnect card is controlled via the second controller included in the second interconnect card. In response to a failure of the second controller included in the second interconnect card, the second interconnect card is controlled via the first controller included in the first interconnect card.

20 Claims, 11 Drawing Sheets

US 8,151,051 B2

REDUNDANT SOLID STATE DISK SYSTEM VIA INTERCONNECT CARDS

BACKGROUND

1. Field

The disclosure relates to a method, a system, and an article of manufacture for a redundant solid state disk system via interconnect cards.

2. Background

A solid state disk (SSD) may comprise a data storage device that uses solid state memory to store persistent digital data. Solid state disks may include flash memory or memory of other types. Solid state disks may be accessed much faster in comparison to electromechanically accessed data storage devices, such as, hard disks.

Solid stated disks are available in a variety of form factors. In addition to solid state disks that fit into traditional hard disk form factors, solid state disks may be incorporated into cards, such as Peripheral Component Interconnect Express (PCIE) cards or other types of cards. For example, certain cards may package a certain amount of NAND flash devices along with a controller onto a PCIE form factor compliant card. Although not a traditional disk format, such cards may be used to perform many of the functions performed by hard disks.

SUMMARY OF THE PREFERRED EMBODIMENTS

Provided are a method, a system, and an article of manufacture, in which a first interconnect card is configured, wherein a first controller is included in the first interconnect card. A second interconnect card coupled to the first interconnect card is configured, wherein a second controller is included in the second interconnect card. In response to a failure of the first controller included in the first interconnect card, the first interconnect card is controlled via the second controller included in the second interconnect card. In response to a failure of the second controller included in the second interconnect card, the second interconnect card is controlled via the first controller included in the first interconnect card.

In certain embodiments, the first interconnect card includes a first plurality of solid state devices, wherein in response to determining that the first controller is operational the first plurality of solid state devices are controlled by the first controller. The second interconnect card includes a second plurality of solid state devices, wherein in response to determining that the second controller is operational the second plurality of solid state devices are controlled by the second controller.

In certain additional embodiments, data is mirrored from the first plurality of solid state devices to the second plurality of solid state devices. In response to a failure of the first controller included in the first interconnect card, the first plurality of solid state devices are controlled via the second controller included in the second interconnect card. In response to a failure of the second controller included in the second interconnect card, the second plurality of solid state devices are controlled via the first controller included in the first interconnect card.

In further embodiments, the first and second interconnect cards are Peripheral Component Interconnect Express (PCIE) cards. A first connector included in the first interconnect card is coupled to the first controller and a first plurality of expanders that are coupled to the first plurality of solid state devices. A second connector included in the second interconnect card is coupled to the second controller and a second plurality of expanders that are coupled to the second plurality of solid state devices, wherein the first and the second connectors are coupled. A physical replacement of the first controller is allowed in response to the failure of the first controller, wherein while the first controller is being physically replaced the first plurality of solid state devices remain operational and access is allowed to the first plurality of solid state devices.

In additional embodiments, a third interconnect card is configured, wherein the first, second, and third interconnect cards communicate via a fabric, wherein a third controller is included in the third interconnect card, and wherein the first, second, and third interconnect cards remain operational in response to a failure of any one of the first, second, and third controllers.

In further embodiments, the first interconnect card includes a capacitor and a battery to provide power and maintain the first interconnect card in an operational state, in response to a failure of external power to the first interconnect card. The first interconnect card also comprises a daughter card that includes the first controller, wherein the daughter card is replaced to replace the first controller with a new controller, in response to the failure of the first controller, and wherein the first controller is operable as a Redundant Array of Independent Disk (RAID) controller. A plurality of replaceable solid state devices are included in the first interconnect card, wherein in response to a failure of a replaceable solid state device, the replaceable solid state device is replaced with a new solid state device while the first interconnect card is operational. Expanders are included in the first interconnect card to couple the first controller to the plurality of solid state devices. Furthermore, Serial Access Small Computer System Interface (SAS) connections are included in the first interconnect card to communicate data to other devices and to components included in the first interconnect card.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Redundant Solid State Disk System

Critical data that should not be lost may be stored on a plurality of solid state disks. In order to provide redundancy, system software may perform mirroring or configure a plurality of solid state disks into a Redundant Array or Independent Disks (RAID). Software RAID may not be adequate in terms of performance to exploit the fast performance of solid state disk drives. Certain embodiments not only achieve redundancy of data but also exploit the performance advantages of solid state disks.

Certain embodiments provide a PCIE form factor compliant card which integrates a RAID controller, Application Specific Integrated Circuit (ASIC), several NAND flash controllers and NAND flashes, and allows interconnection between a pair of cards for redundancy. If a solid state device card fails, there is enough spare capacity such that no card needs to be replaced until the second failure. Additionally, if the RAID controller fails, in certain embodiments the RAID controller can be replaced through a front bezel without affecting the NAND flashes. In certain embodiments, the RAID controller may be a card that is plugged inside the PCIE card. All solid state devices can be accessed via the surviving RAID controller while the failing RAID controller is serviced.

In certain embodiments, each solid state device is packaged in some type of DIMM form factor. In an exemplary embodiment, 6 SSD cards may be fitted in a PCIE card. A Serial Attached Small Computer System Interface (SAS) fabric may be provided such that each RAID controller can secure access to each solid state disk. Even when the RAID controller is being serviced, all solid state disks are accessible.

Exemplary Embodiments

Figure 1:
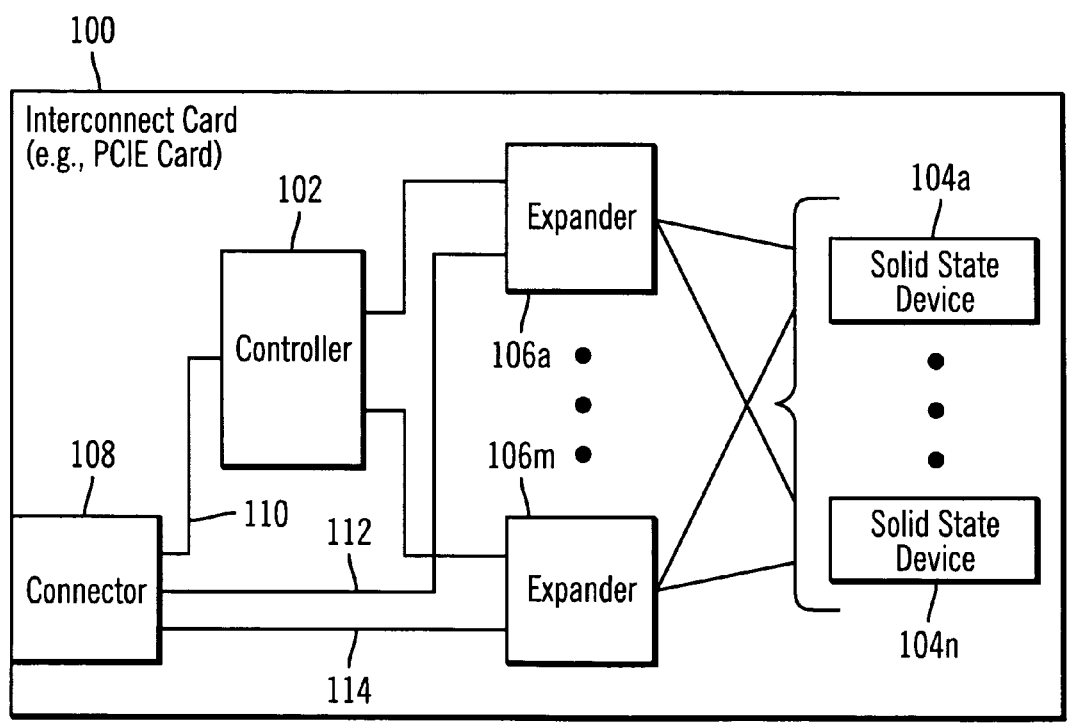
FIG. 1 illustrates a block diagram of an exemplary interconnect card, in accordance with certain embodiments.

FIG. 1 illustrates a block diagram of an exemplary interconnect card 100, in accordance with certain embodiments. The interconnect card 100 may comprise any hardware-implemented card or hardware-implemented adapter that may be coupled to a computational device, wherein the hardware-implemented card may include software or firmware for performing various operations. The interconnect card 100 may reside within a computational device or may be positioned such that the interconnect card is removable from external slots present in the computational device. For example, in certain embodiments the interconnect card 100 may be a PCIE card or a PCIE form factor complaint card.

The interconnect card 100 includes at least a controller 102, a plurality of solid state devices 104a ... 104n, a plurality of expanders 106a ... 106m, and at least one connector 108.

The controller 102 controls the plurality of solid state devices 104a ... 104n. The expanders 106a ... 106m allow an expansion in the number of solid state devices 104a ... 104n that may be controlled by the controller 102. For example, in certain embodiments two expanders may allow the controller 102 to control sixteen solid state devices. The connector 108 may be used to connect to the controller 102 and also to connect to the expanders 106a ... 106m. For example, in FIG. 1, connecting element 110 provides a connection between the connector 108 and the controller 102, connecting element 112 provides a connection between the connector 108 and the expander 106a, and connecting element 114 provides a connection between the connector 108 and the expander 106m. Each of the connecting elements 110, 112, 114 may be implemented by one or more wires, via a bus, or via other mechanisms.

Figure 2:
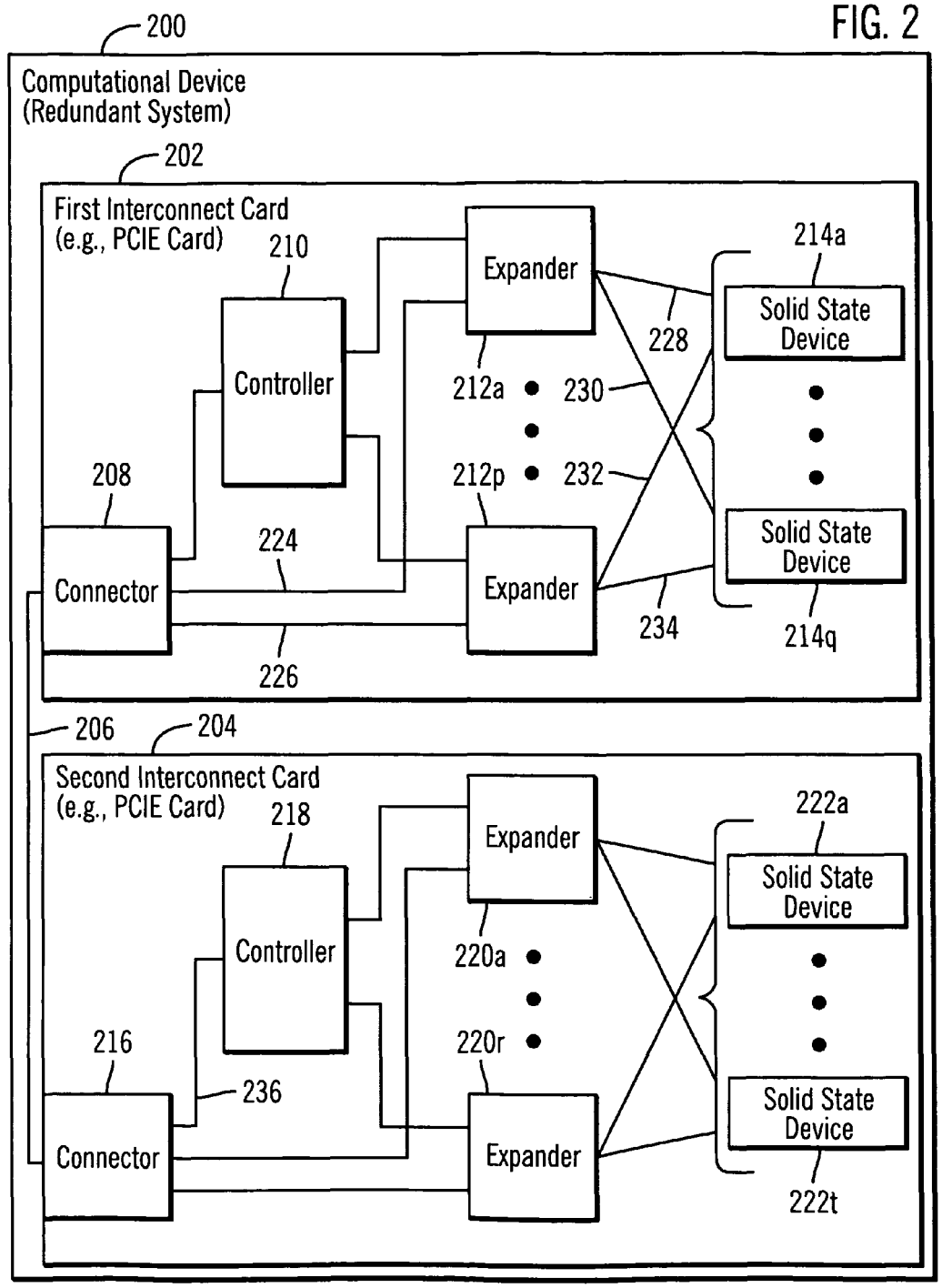
FIG. 2 illustrates a block diagram that shows how a first interconnect card is coupled to a second interconnect card in a computational device, in accordance with certain embodiments.

FIG. 2 illustrates a block diagram of a computational device 200 in which a first interconnect card 202 is coupled to a second interconnect card 204 via an interconnecting element 206, in accordance with certain embodiments. In certain embodiments the interconnecting element 206 that couples the interconnect cards 202, 204 may be a SAS connection or some other type of connection. The interconnect cards 202, 204 may correspond to the interconnect card 100 that has been shown earlier in FIG. 1.

The interconnect card 202 includes a connector 208, a controller 210, a plurality of expanders 212a ... 212p, and a plurality of solid state devices 214a ... 214q. The interconnect card 204 includes a connector 216, a controller 218, a plurality of expanders 220a ... 220r, and a plurality of solid state devices 222a ... 222t.

In certain embodiments, in response to a failure of the controller 210, the controller 218 may be used to control the solid state devices 214a ... 214q via the connections 206, 224, 226, 228. 230, 232, 234, 236. The connections 206, 224, 226, 228. 230, 232, 234, 236 connect the solid state devices 214a ... 214q to the controller 218 via the connectors 208, 216 and the expanders 212a ... 212p. Similarly, in response to a failure of the controller 218, the controller 210 may be used to control the solid state devices 222a ... 222t. Therefore, the computational device 200 is a redundant system in which a failure of a controller in any of the interconnect cards 202, 204 allows the solid state devices 214a ... 214q, 222a ... 222t to remain operational and be accessible.

Figure 3:
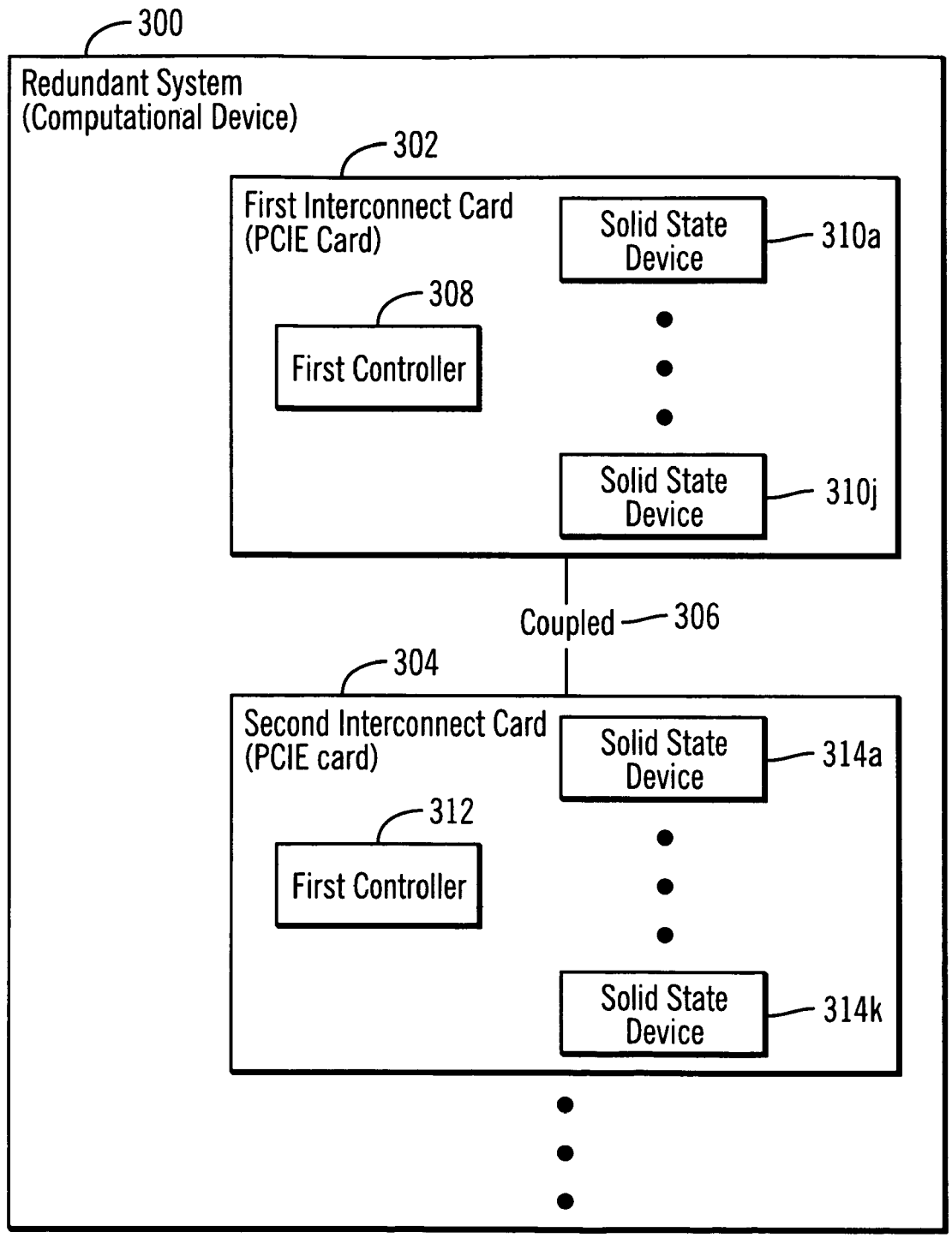
FIG. 3 illustrates a block diagram of a redundant system that includes at least a first interconnect card and a second interconnect card, in accordance with certain embodiments.

FIG. 3 illustrates a block diagram of a redundant system 300 corresponding to the computational device 200 of FIG. 2, wherein the redundant system 300 includes at least a first interconnect card 302 and a second interconnect card 304 that are coupled 306, in accordance with certain embodiments.

The first interconnect card 302 includes a first controller 308 that controls a first plurality of solid state devices 310a ... 310j, and the second interconnect card 304 includes a second controller 312 that controls a second plurality of solid state devices 314a ... 314k.

Figure 4:
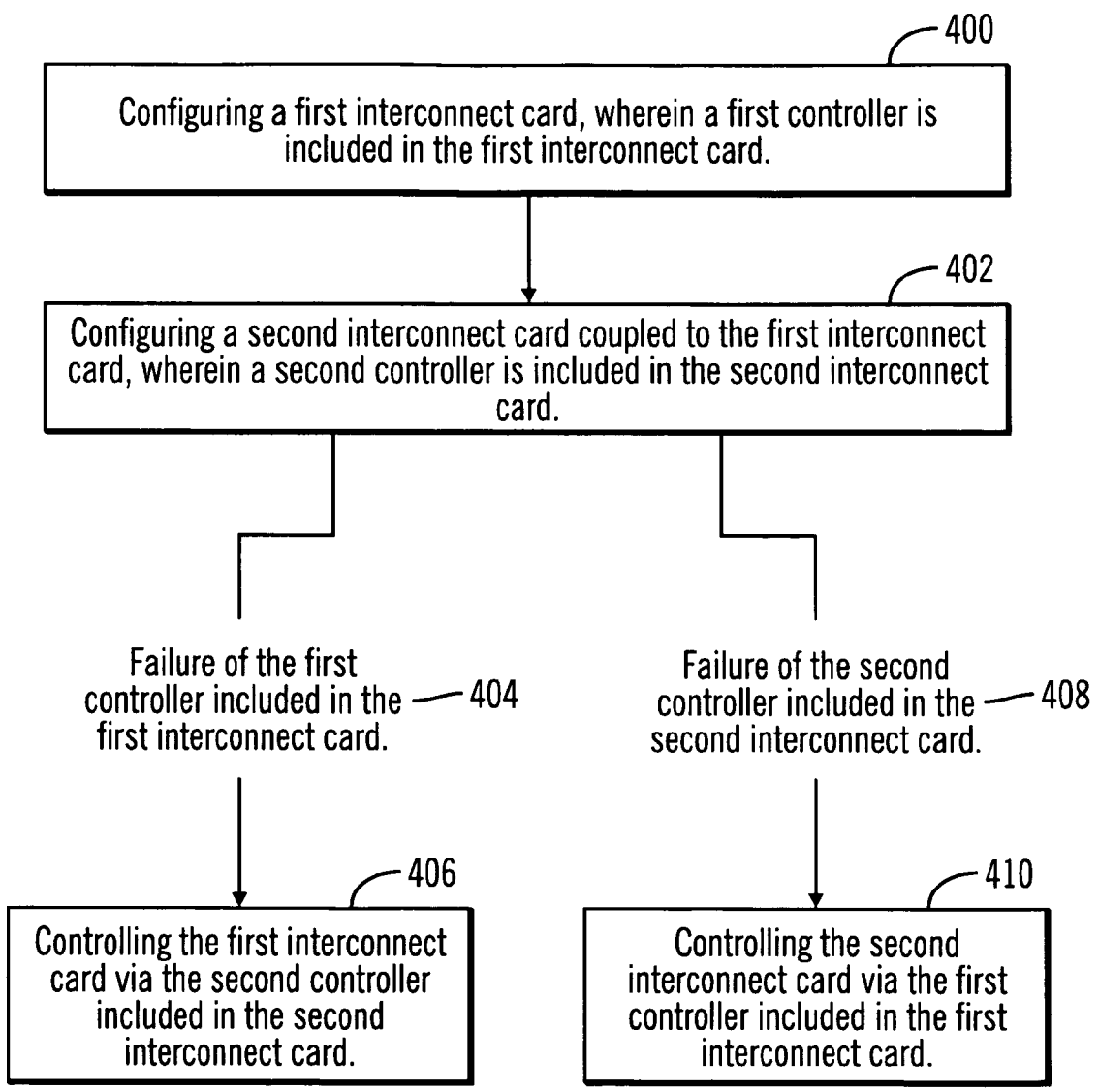
FIG. 4 illustrates a flowchart that shows first operations implemented in the redundant system of FIG. 3, in accordance with certain embodiments.

FIG. 4 illustrates a flowchart that shows first operations implemented in the redundant system 300 of FIG. 3, in accordance with certain embodiments. The operations illustrated in FIG. 4 may be implemented by one or more processors, application specific integrated circuits (ASIC), controllers, etc., that may be present in the redundant system 300.

Control starts at block 400, in which a first interconnect card 302 is configured, wherein a first controller 308 is included in the first interconnect card 302. A second interconnect card 304 coupled 306 to the first interconnect card 302 is configured (at block 402), wherein a second controller 312 is included in the second interconnect card 304.

In response to a failure (reference numeral 404) of the first controller 308 included in the first interconnect card 302, control proceeds to block 406 in which the first interconnect card 302 is controlled via the second controller 312 included in the second interconnect card 304.

In response to a failure (reference numeral 408) of the second controller 312 included in the second interconnect card 304, the second interconnect card 304 is controlled (at block 410) via the first controller 308 included in the first interconnect card 302.

Figure 5:
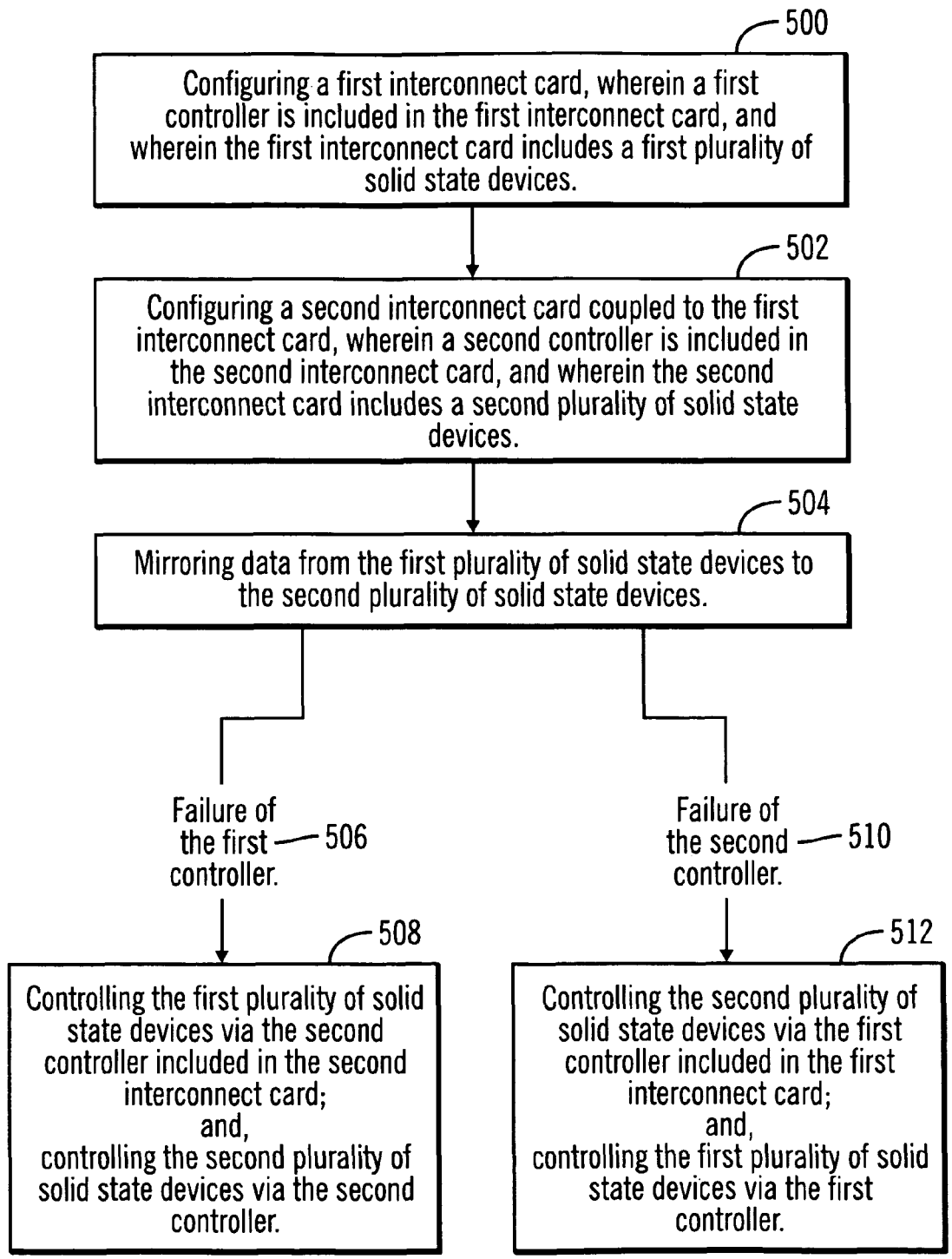
FIG. 5 illustrates a flowchart that shows second operations implemented in the redundant system of FIG. 3, in accordance with certain embodiments.

FIG. 5 illustrates a flowchart that shows second operations implemented in the redundant system 300 of FIG. 3, in accordance with certain embodiments. The operations illustrated in FIG. 5 may be implemented by one or more processors, application specific integrated circuits (ASIC), controllers, etc., that may be present in the redundant system 300.

Control starts at block 500, in which a first interconnect card 302 is configured, wherein a first controller 308 is included in the first interconnect card 302, and wherein the first interconnect card 302 includes a first plurality of solid state devices 310a . . . 310j. Control proceeds to block 502 in which a second interconnect card 304 coupled 306 to the first interconnect card 302 is configured, wherein a second controller 312 is included in the second interconnect card 304, and wherein the second interconnect card 304 includes a second plurality of solid state devices 314a . . . 314k. In certain embodiments, data is mirrored (at block 504) from the first plurality of solid state devices 310a . . . 310j to the second plurality of solid state devices 314a . . . 314k. In certain alternative embodiments mirroring of data is not performed, but the solid state devices 310a . . . 310j, 314a . . . 314k are collectively used for storing critical data, wherein critical data is data whose loss cannot be tolerated.

In response to a failure (reference numeral 506) of the first controller 308, control proceeds to block 508 in which the first plurality of solid state devices 310a . . . 310j are controlled via the second controller 312 included in the second interconnect card 304, and the second plurality of solid state devices 314a . . . 314k continue to remain controlled via the second controller 312.

In response to a failure (reference numeral 510) of the second controller 312, control proceeds to block 512 in which the second plurality of solid state devices 314a . . . 314k are controlled via the first controller 308 included in the first interconnect card 302, and the first plurality of solid state devices 310a . . . 310j continue to remain controlled via the first controller 308.

In certain embodiments, the first and second interconnect cards 302, 304 of the redundant system 300 in which the operations shown in FIGS. 4 and 5 are performed are Peripheral Component Interconnect Express (PCIE) cards. A physical replacement of the first controller 308 is allowed in response to the failure of the first controller 308, wherein while the first controller 308 is being physically replaced the first plurality of solid state devices 310a . . . 310j remain operational and access is allowed to the first plurality of solid state devices 310a . . . 310j. The first controller 308 may be implemented in the form of a removable card within the first interconnect card 302. Similarly, the second controller 312 may also be physically replaced.

Figure 6:
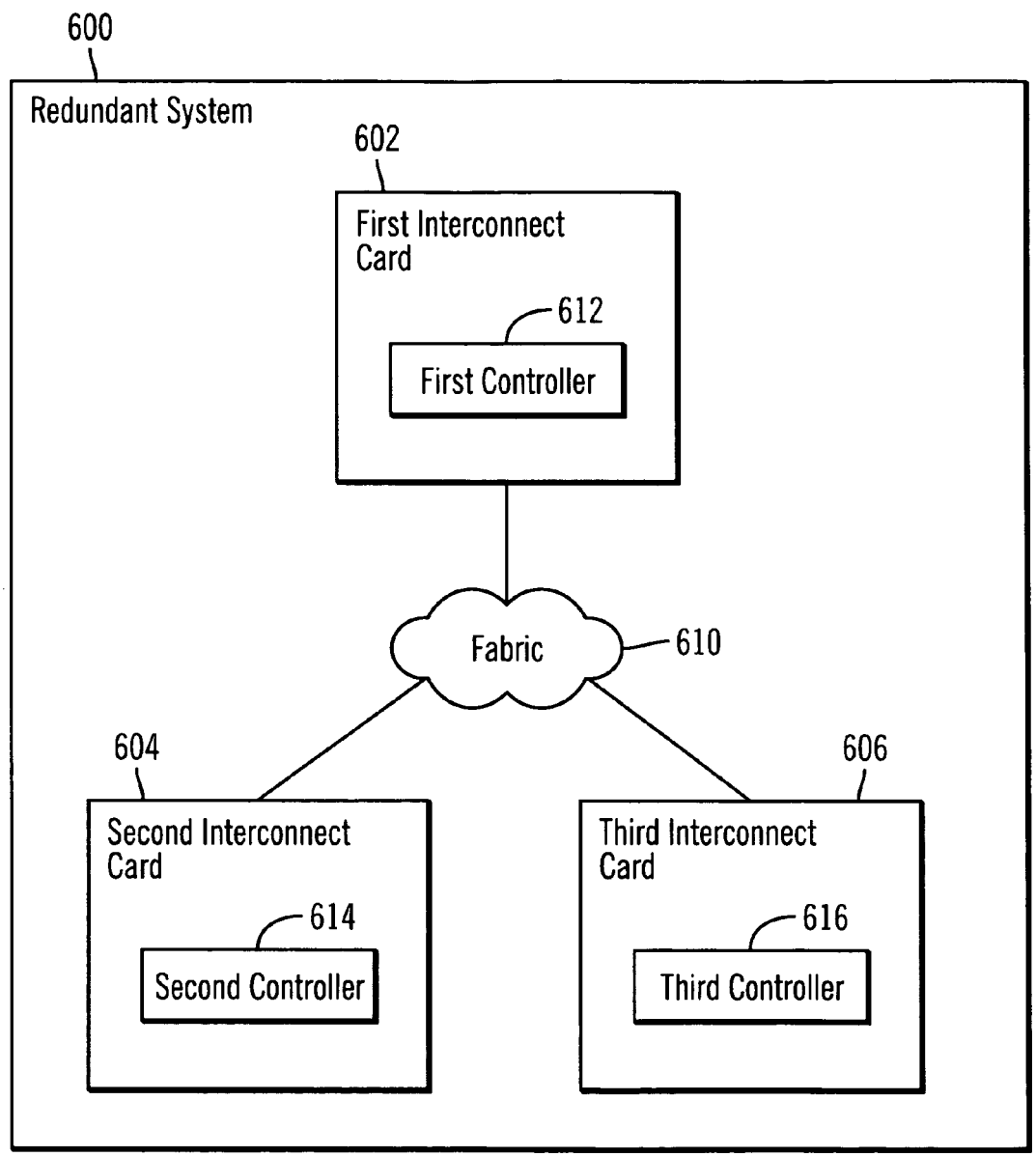
FIG. 6 illustrates a block diagram of a redundant system that includes at least three interconnect cards that communicate via a fabric, in accordance with certain embodiments.

FIG. 6 illustrates a block diagram of a redundant system 600 that includes at least three interconnect cards 602, 604, 606 that communicate via a fabric 610, in accordance with certain embodiments. The first, second, and third interconnect cards 602, 604, 606 include first, second, and third controllers 612, 614, 616 respectively. In certain embodiments, the first, second, and third interconnect cards 602, 604, 606 remain operational in response to a failure of any one of the first, second, and third controllers 612, 614, 616. The solid state devices that may be present in the interconnect cards 602, 604, 606 also stay operational.

Figure 7:
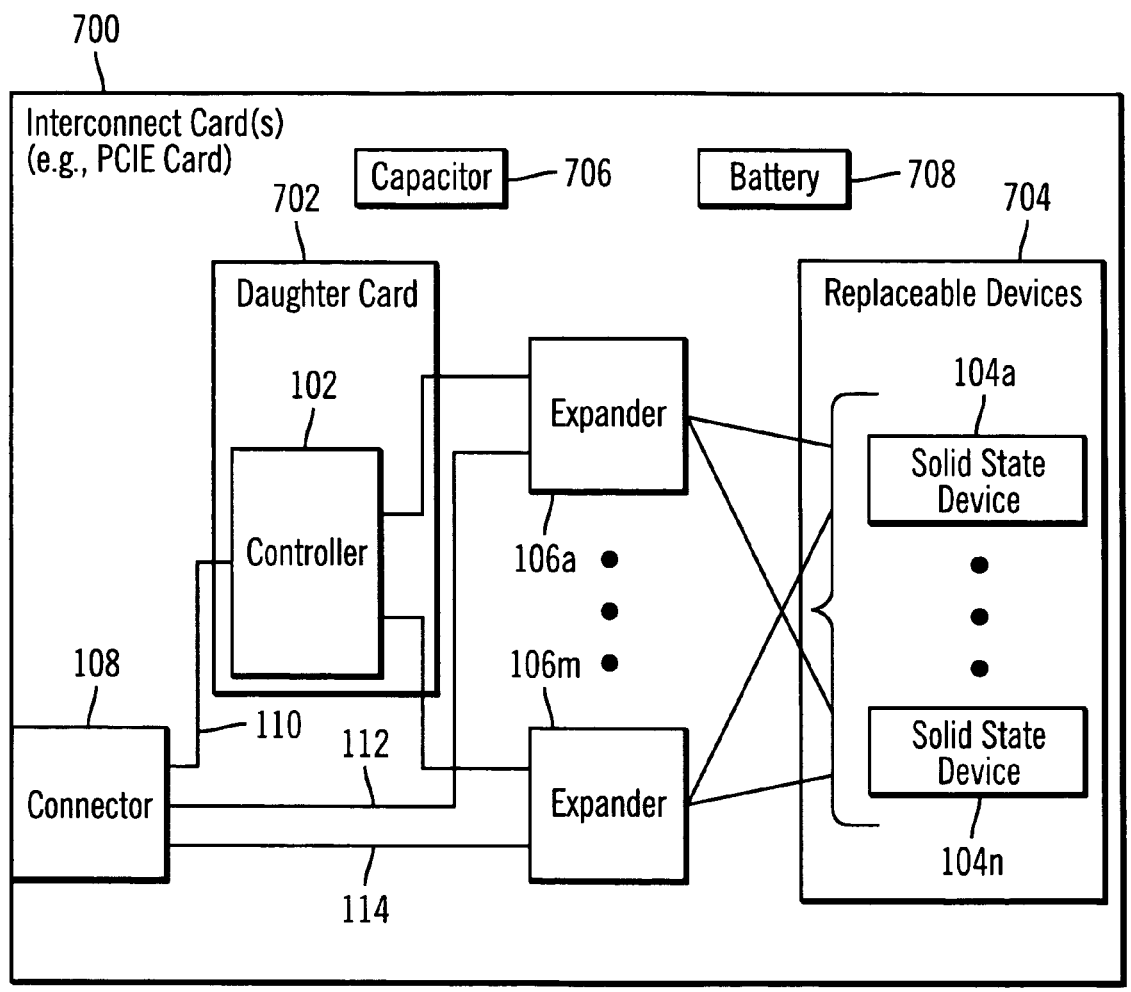
FIG. 7 illustrates a block diagram of an exemplary augmented interconnect card, in accordance with certain embodiments.

FIG. 7 illustrates a block diagram of an exemplary augmented interconnect card 700, in accordance with certain embodiments. The augmented interconnect card 700 includes certain enhancements included in the interconnect card 100 shown in FIG. 1.

The augmented interconnect card 700 is a PCIE card in which the controller 102 is included in a replaceable daughter card 702 and the solid state devices 104a . . . 104n are replaceable devices. The augmented interconnect card 700 may also include a capacitor 706 and a battery 708. In certain embodiments, the capacitor 706 may comprise a supercapacitor that stores charge that is adequate to keep the augmented interconnect card operational for a certain period of time even when external power supply to the augmented interconnect card has failed.

Figure 8:
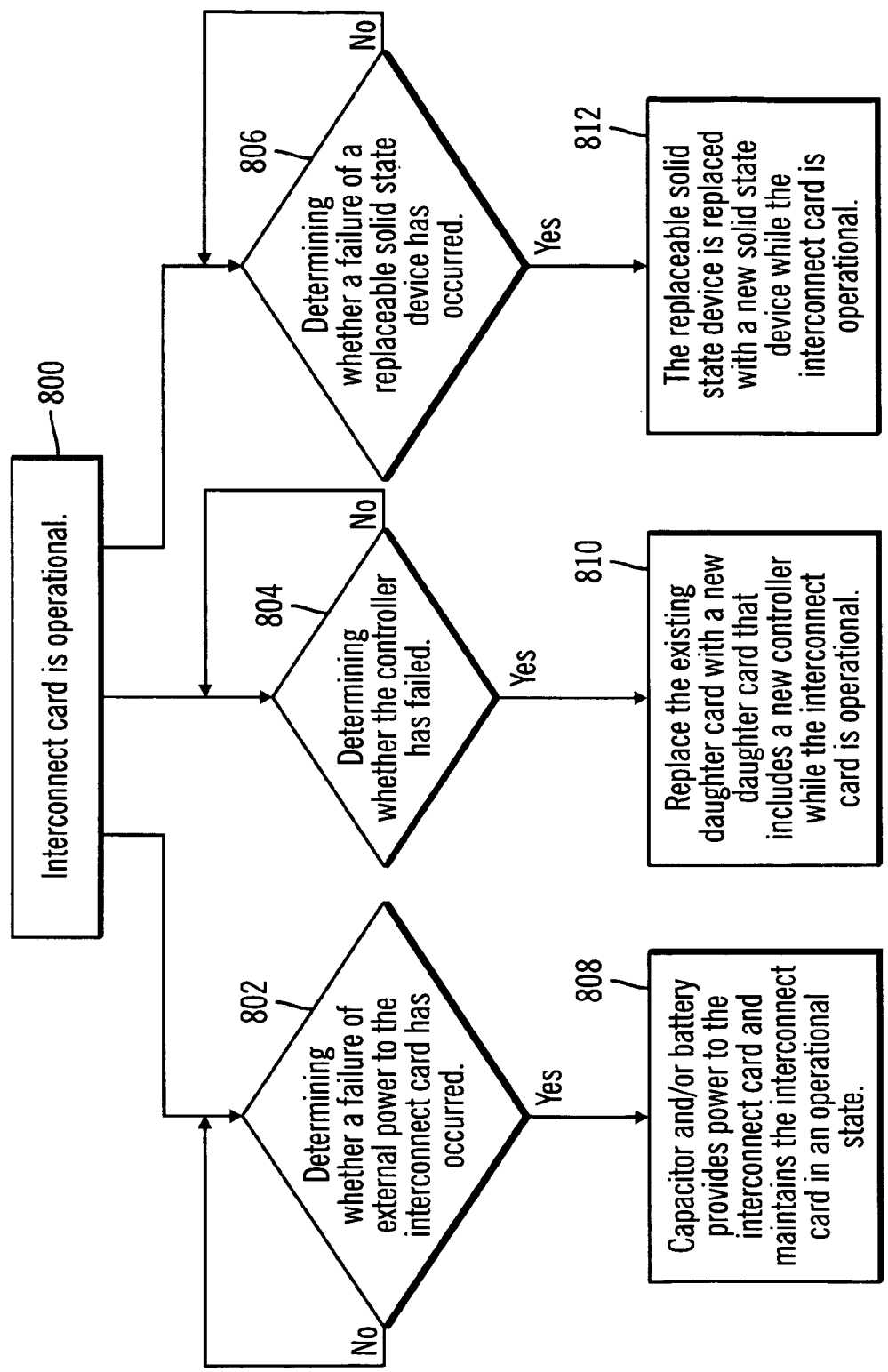
FIG. 8 illustrates a flowchart that shows third operations implemented in the redundant system of FIG. 3, wherein the interconnect cards used in the redundant system of FIG. 3 are the augmented exemplary interconnect cards shown in FIG. 7, in accordance with certain embodiments.

FIG. 8 illustrates a flowchart that shows third operations implemented in the redundant system 300 of FIG. 3, wherein each of the interconnect cards 302, 304 used in the redundant system of FIG. 3 is comprised of the augmented exemplary interconnect card 700 (shown in FIG. 7), in accordance with certain embodiments.

Control starts at block 800 in which an interconnect card 700 is operational. From block 800, control may proceed in parallel to blocks 802, 804, 806.

At block 802 a determination is made as to whether a failure of external power to the augmented interconnect card 700 has occurred. If so, the capacitor 706 and/or the battery 708 provides (at block 808) power to the augmented interconnect card 700 and maintains the augmented interconnect card 700 in an operational state. If not, a determination is made once again as to whether to whether a failure of external power to the augmented interconnect card 700 has occurred.

At block 804 a determination is made as to whether the controller 102 included in the daughter card 702 has failed. If so, then the existing daughter card 702 is replaced (at block 810) with a new daughter card that includes a new controller while the interconnect card 700 is operational. If not, a determination is made once again as to whether the controller 102 included in the daughter card 702 has failed At block 806, a determination is made as to whether a failure of a replaceable solid state device has occurred. If so, the failed replaceable solid state device is replaced (at block 812) with a new solid state device while the interconnect card 700 is operational.

Therefore, FIGS. 7-8 illustrate certain embodiments in which a controller may be replaced by replacing the daughter card that includes the controller. Furthermore, a solid state device may be replaced while an interconnect card is operational. Additionally, in the event of a failure of external power to an interconnect card, capacitors and/or batteries included in the interconnect card may maintain the interconnect card in an operational state.

Figure 9:
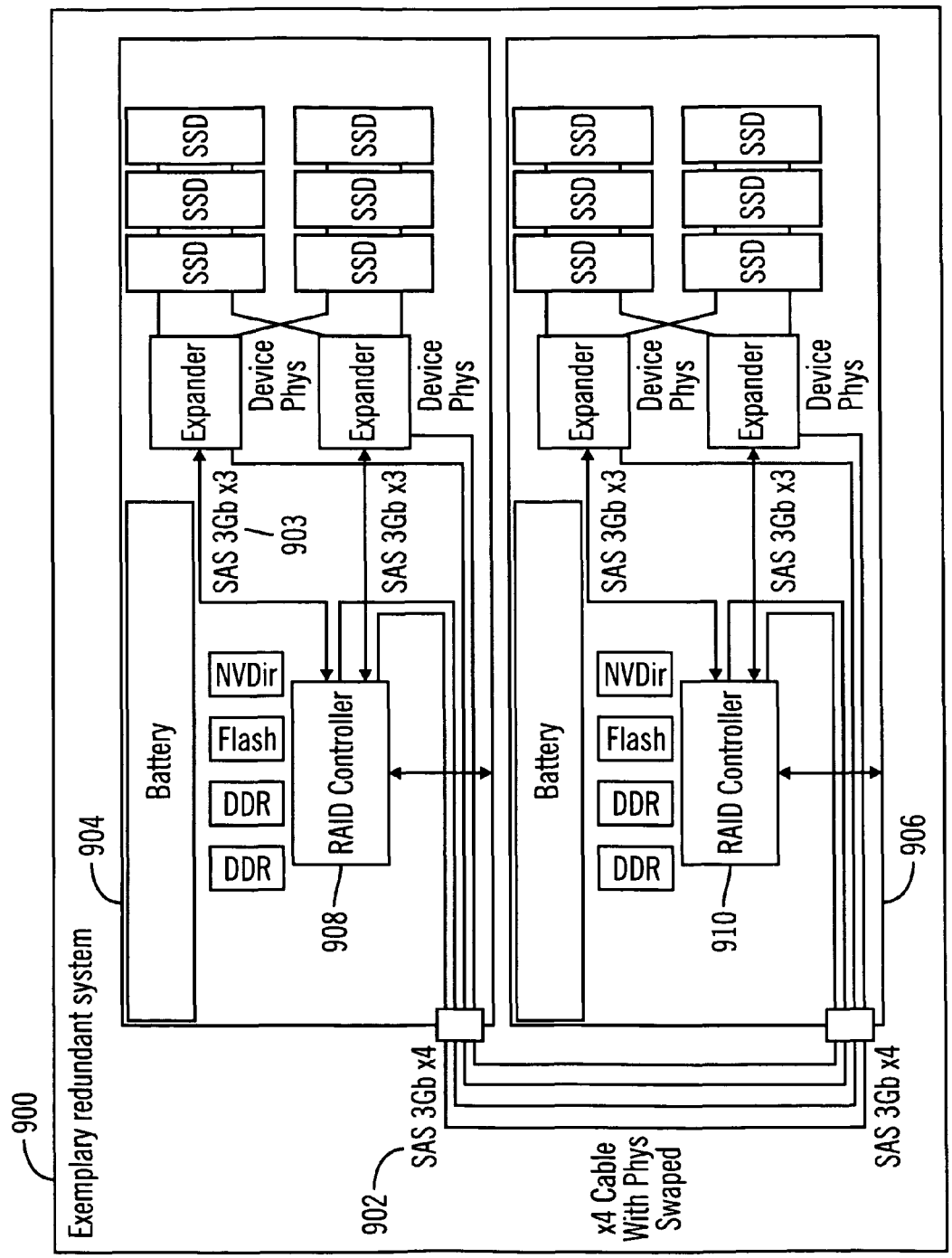
FIG. 9 illustrates a block diagram of a redundant system that uses Serial Attached Small Computer System Interface (SAS) connections, in accordance with certain embodiments.

FIG. 9 illustrates a block diagram of an exemplary redundant system 900 that uses SAS connections, in accordance with certain embodiments. SAS, i.e., serial attached SCSI connections 902 may be used for high speed data transfer between two interconnect cards 904, 906. The SAS connections 902 show four exemplary lines each carrying 3 Gbytes of data. The interconnections among components of the interconnect cards may also comprise SAS connections (e.g., SAS connection 903).

The controller of each of the interconnect cards 904, 906 may be referred to as Redundant Array of Independent Disks (RAID) controllers 908, 910, wherein the RAID controllers 908, 910 may in certain embodiments implement a RAID system with the solid state devices (SSD) shown in FIG. 9.

Figure 10:
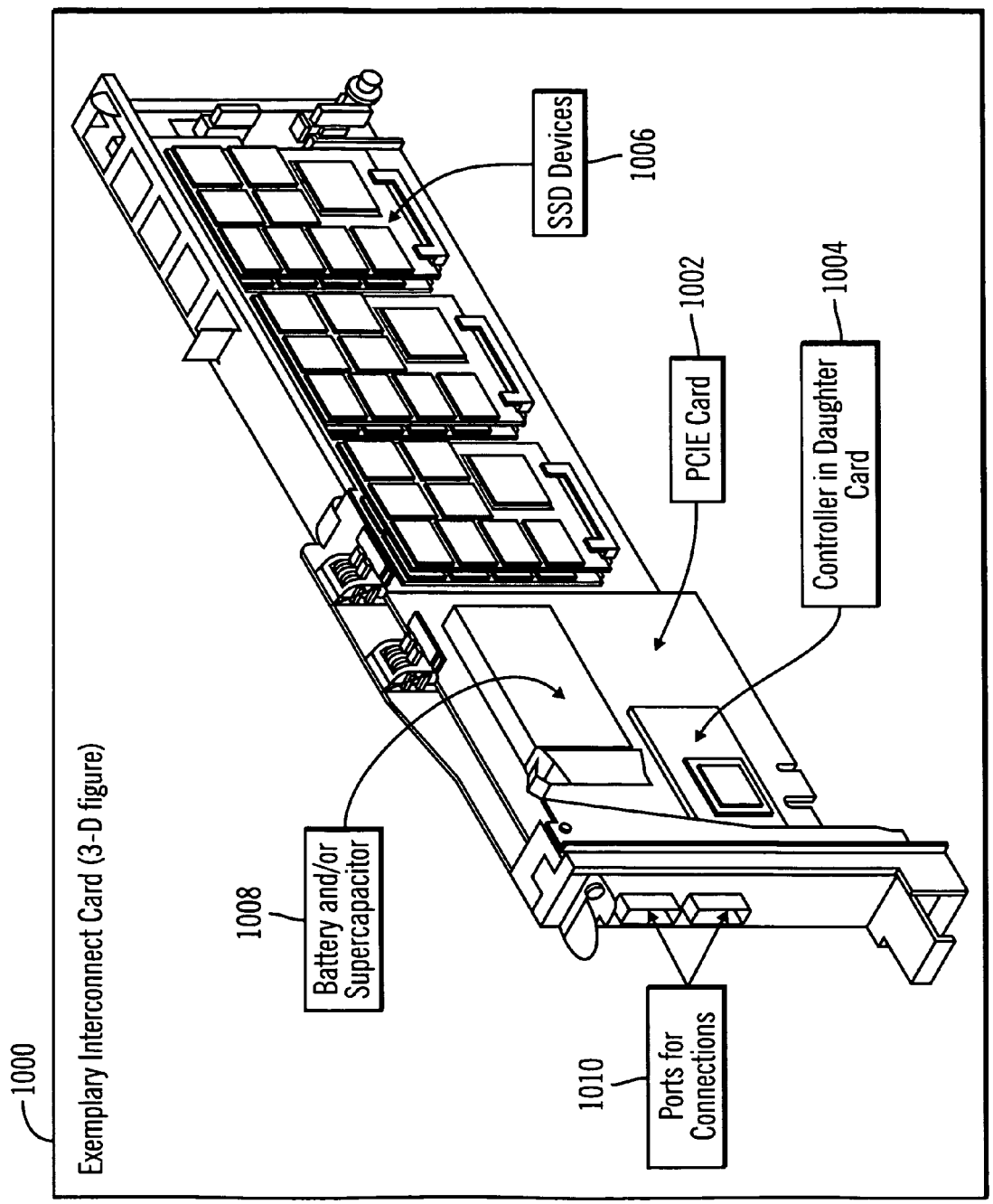
FIG. 10 illustrates a three dimensional diagram of an exemplary interconnect card, in accordance with certain embodiments.

FIG. 10 illustrates a three dimensional diagram of an exemplary interconnect card 1000, in accordance with certain embodiments. The interconnect card 1000 is a PCIE card 1002 that includes the controller in a daughter card (shown via reference numeral 1002), solid state devices 1006, batteries and/or supercapacitors 1008, and one or more ports 1010 for connections to other cards or devices.

Therefore, FIGS. 1-10 illustrate certain embodiments in which a redundant system is created by coupling a plurality of interconnect cards that include solid state devices. In response to a failure of a controller within a first interconnect card, an operational controller within a second interconnect card starts controlling the solid state devices present in the first interconnect card.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment or an embodiment comprising hardware processing software elements In certain embodiments, selected operations may be implemented in microcode that is present in one or more computational devices.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 11:
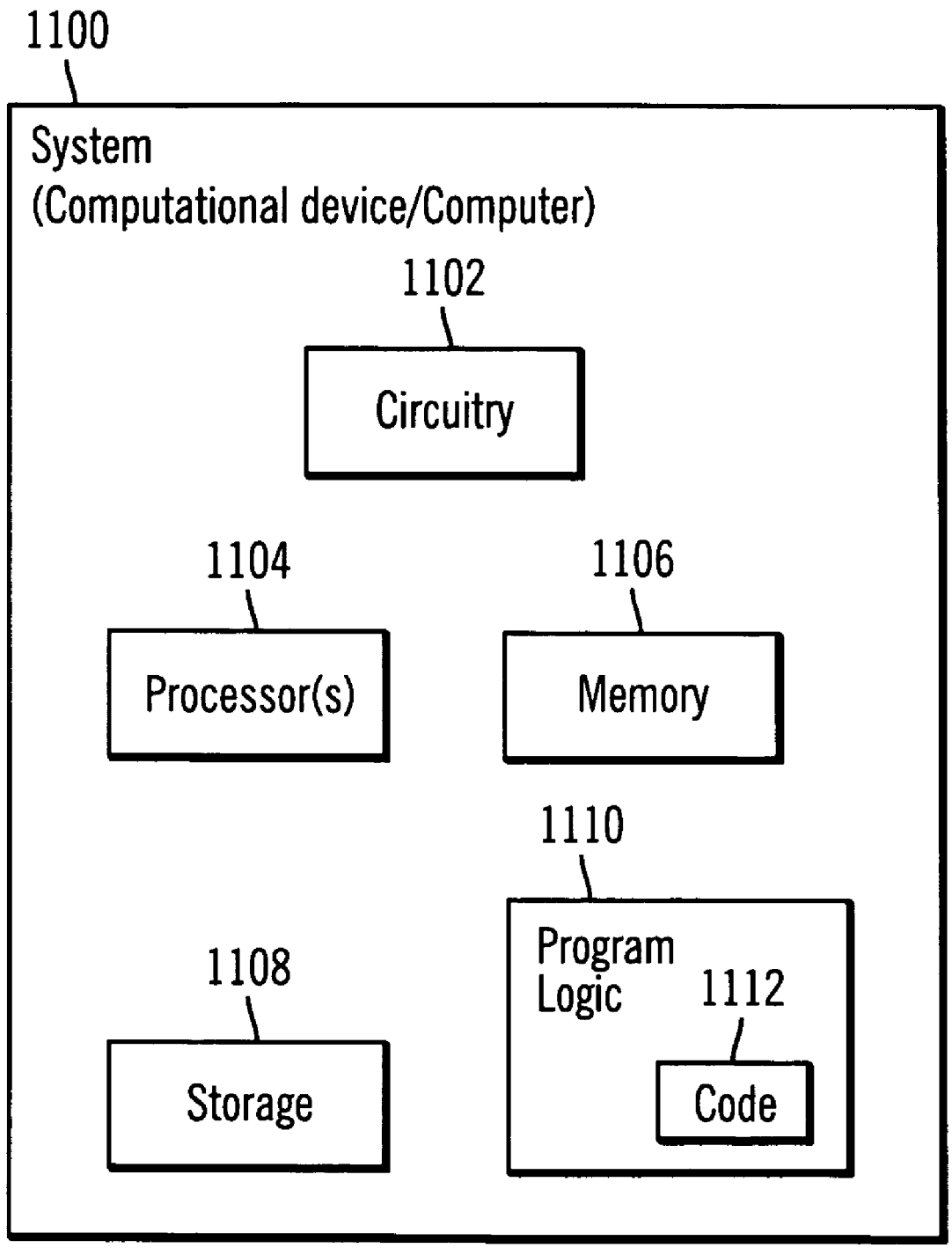
FIG. 11 illustrates a block diagram of a computational device that shows certain elements that may be included in the redundant system of FIG. 3, in accordance with certain embodiments.

FIG. 11 illustrates a block diagram that shows certain elements that may be included in the redundant system 300, 900 in accordance with certain embodiments. The redundant system 300, 900 may also be referred to as a system 1100, and may include a circuitry 1102 that may in certain embodiments include at least a processor 1104. In addition to the interconnect cards shown earlier, the system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-11 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-11 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
configuring, by a processor, a first interconnect card, wherein a first controller is included in the first interconnect card;
configuring a second interconnect card coupled to the first interconnect card, wherein a second controller is included in the second interconnect card;
in response to a failure of the first controller included in the first interconnect card, controlling the first interconnect card via the second controller included in the second interconnect card; and
in response to a failure of the second controller included in the second interconnect card, controlling the second interconnect card via the first controller included in the first interconnect card, wherein the first interconnect card includes:
a capacitor and a battery to provide power and maintain the first interconnect card in an operational state, in response to a failure of external power to the first interconnect card;
a daughter card that includes the first controller, wherein the daughter card is replaced to replace the first controller with a new controller, in response to the failure of the first controller and wherein the first controller is operable as a Redundant Array of Independent Disk (RAID) controller;
a plurality of replaceable solid state devices, wherein in response to a failure of a replaceable solid state device, the replaceable solid state device is replaced with a new solid state device while the first interconnect card is operational;
expanders to couple the first controller to the plurality of solid state devices; and
Serial Access Small Computer System Interface (SAS) connections to communicate data to other devices and to components included in the first interconnect card.

2. The method of claim 1, wherein:
the first interconnect card includes a first plurality of solid state devices, wherein in response to determining that the first controller is operational the first plurality of solid state devices are controlled by the first controller; and
the second interconnect card includes a second plurality of solid state devices, wherein in response to determining that the second controller is operational the second plurality of solid state devices are controlled by the second controller.

3. The method of claim 2, the method further comprising:
mirroring data from the first plurality of solid state devices to the second plurality of solid state devices;
in response to a failure of the first controller included in the first interconnect card, controlling the first plurality of solid state devices via the second controller included in the second interconnect card; and
in response to a failure of the second controller included in the second interconnect card, controlling the second plurality of solid state devices via the first controller included in the first interconnect card.

4. The method of claim 2, wherein the first and second interconnect cards are Peripheral Component Interconnect Express (PCIE) cards, wherein a first connector included in the first interconnect card is coupled to the first controller and a first plurality of expanders that are coupled to the first plurality of solid state devices, wherein a second connector included in the second interconnect card is coupled to the second controller and a second plurality of expanders that are coupled to the second plurality of solid state devices, wherein the first and the second connectors are coupled, and wherein the method further comprises:
allowing a physical replacement of the first controller in response to the failure of the first controller, wherein while the first controller is being physically replaced the first plurality of solid state devices remain operational and access is allowed to the first plurality of solid state devices.

5. The method of claim 1, the method further comprising:
configuring a third interconnect card, wherein the first, second, and third interconnect cards communicate via a fabric, wherein a third controller is included in the third interconnect card, and wherein the first, second, and third interconnect cards remain operational in response to a failure of any one of the first, second, and third controllers.

6. The method of claim 1:
wherein the capacitor comprises a supercapacitor that stores charge that is adequate to keep the first interconnect card operational for a period of time even when the external power supply to the first interconnect card has failed;

wherein the first interconnect card comprises a plurality of NAND flashes; and wherein a failed RAID controller is replaced through a front bezel without affecting the plurality of NAND flashes.

7. A computer readable storage medium, wherein code stored in the computer readable storage medium in response to being executed by a processor performs operations, the operations comprising:

configuring a first interconnect card, wherein a first controller is included in the first interconnect card;

configuring a second interconnect card coupled to the first interconnect card, wherein a second controller is included in the second interconnect card;

in response to a failure of the first controller included in the first interconnect card, controlling the first interconnect card via the second controller included in the second interconnect card; and in response to a failure of the second controller included in the second interconnect card, controlling the second interconnect card via the first controller included in the first interconnect card, wherein the first interconnect card includes:

a capacitor and a battery to provide power and maintain the first interconnect card in an operational state, in response to a failure of external power to the first interconnect card;

a daughter card that includes the first controller, wherein the daughter card is replaced to replace the first controller with a new controller, in response to the failure of the first controller, and wherein the first controller is operable as a Redundant Array of Independent Disk (RAID) controller;

a plurality of replaceable solid state devices, wherein in response to a failure of a replaceable solid state device, the replaceable solid state device is replaced with a new solid state device while the first interconnect card is operational;

expanders to couple the first controller to the plurality of solid state devices; and Serial Access Small Computer System Interface (SAS) connections to communicate data to other devices and to components included in the first interconnect card.

8. The computer readable storage medium of claim 7, wherein:

the first interconnect card includes a first plurality of solid state devices, wherein in response to determining that the first controller is operational the first plurality of solid state devices are controlled by the first controller; and the second interconnect card includes a second plurality of solid state devices, wherein in response to determining that the second controller is operational the second plurality of solid state devices are controlled by the second controller.

9. The computer readable storage medium of claim 8, the operations further comprising:

mirroring data from the first plurality of solid state devices to the second plurality of solid state devices;

in response to a failure of the first controller included in the first interconnect card, controlling the first plurality of solid state devices via the second controller included in the second interconnect card; and in response to a failure of the second controller included in the second interconnect card, controlling the second plurality of solid state devices via the first controller included in the first interconnect card.

10. The computer readable storage medium of claim 8, wherein the first and second interconnect cards are Peripheral Component Interconnect Express (PCIE) cards, wherein a first connector included in the first interconnect card is coupled to the first controller and a first plurality of expanders that are coupled to the first plurality of solid state devices, wherein a second connector included in the second interconnect card is coupled to the second controller and a second plurality of expanders that are coupled to the second plurality of solid state devices, wherein the first and the second connectors are coupled, and wherein the operations further comprise:

allowing a physical replacement of the first controller in response to the failure of the first controller, wherein while the first controller is being physically replaced the first plurality of solid state devices remain operational and access is allowed to the first plurality of solid state devices.

11. The computer readable storage medium of claim 7, the operations further comprising:

configuring a third interconnect card, wherein the first, second, and third interconnect cards communicate via a fabric, wherein a third controller is included in the third interconnect card, and wherein the first, second, and third interconnect cards remain operational in response to a failure of any one of the first, second, and third controllers.

12. The computer readable storage medium of claim 7:

wherein the capacitor comprises a supercapacitor that stores charge that is adequate to keep the first interconnect card operational for a period of time even when the external power supply to the first interconnect card has failed;

wherein the first interconnect card comprises a plurality of NAND flashes; and wherein a failed RAID controller is replaced through a front bezel without affecting the plurality of NAND flashes.

13. A system, comprising:

a first interconnect card;

a second interconnect card coupled to the first interconnect card;

a first controller included in the first interconnect card; and a second controller included in the second interconnect card, and wherein the system performs operations, the operations comprising:

configuring the first interconnect card;

configuring the second interconnect card;

in response to a failure of the first controller included in the first interconnect card, controlling the first interconnect card via the second controller included in the second interconnect card; and in response to a failure of the second controller included in the second interconnect card, controlling the second interconnect card via the first controller included in the first interconnect card, wherein the first interconnect card includes:

a capacitor and a battery to provide power and maintain the first interconnect card in an operational state, in response to a failure of external power to the first interconnect card;

a daughter card that includes the first controller, wherein the daughter card is replaced to replace the first controller with a new controller, in response to the failure of the first controller, and wherein the first controller is operable as a Redundant Array of Independent Disk (RAID) controller;
a plurality of replaceable solid state devices, wherein in response to a failure of a replaceable solid state device, the replaceable solid state device is replaced with a new solid state device while the first interconnect card is operational;
expanders to couple the first controller to the plurality of solid state devices; and
Serial Access Small Computer System Interface (SAS) connections to communicate data to other devices and to components included in the first interconnect card.

14. The system of claim 13, the system further comprising:
a first plurality of solid state devices, wherein the first interconnect card includes the first plurality of solid state devices, and wherein in response to determining that the first controller is operational the first plurality of solid state devices are controlled by the first controller; and
a second plurality of solid state devices, wherein the second interconnect card includes the second plurality of solid state devices, wherein in response to determining that the second controller is operational the second plurality of solid state devices are controlled by the second controller.

15. The system of claim 14, the operations further comprising:
mirroring data from the first plurality of solid state devices to the second plurality of solid state devices;
in response to a failure of the first controller included in the first interconnect card, controlling the first plurality of solid state devices via the second controller included in the second interconnect card; and
in response to a failure of the second controller included in the second interconnect card, controlling the second plurality of solid state devices via the first controller included in the first interconnect card.

16. The system of claim 14, wherein the first and second interconnect cards are Peripheral Component Interconnect Express (PCIE) cards, wherein a first connector included in the first interconnect card is coupled to the first controller and a first plurality of expanders that are coupled to the first plurality of solid state devices, wherein a second connector included in the second interconnect card is coupled to the second controller and a second plurality of expanders that are coupled to the second plurality of solid state devices, wherein the first and the second connectors are coupled, and wherein the operations further comprise:
allowing a physical replacement of the first controller in response to the failure of the first controller, wherein while the first controller is being physically replaced the first plurality of solid state devices remain operational and access is allowed to the first plurality of solid state devices.

17. The system of claim 13, the system further comprising:
a third interconnect card, wherein the third interconnect card is configured; and
a fabric, wherein the first, second, and third interconnect cards communicate via the fabric; and
a third controller that is included in the third interconnect card, wherein the first, second, and third interconnect cards remain operational in response to a failure of any one of the first, second, and third controllers.

18. The system of claim 13, wherein computer-readable code is integrated from a computer readable medium into the system.

19. The system of claim 18, wherein the computer-readable code in combination with the system is capable of performing:
the configuring of the first interconnect card;
the configuring of the second interconnect card;
the controlling the first interconnect card via the second controller included in the second interconnect card; and
the controlling of the second interconnect card via the first controller included in the first interconnect card.

20. The system of claim 13:
wherein the capacitor comprises a supercapacitor that stores charge that is adequate to keep the first interconnect card operational for a period of time even when the external power supply to the first interconnect card has failed;
wherein the first interconnect card comprises a plurality of NAND flashes; and
wherein a failed RAID controller is replaced through a front bezel without affecting the plurality of NAND flashes.

* * * * *